United States Patent
Ucar et al.

(10) Patent No.: US 12,060,067 B2
(45) Date of Patent: Aug. 13, 2024

(54) SYSTEMS, METHODS, AND VEHICLES FOR CORRECTING DRIVING BEHAVIOR OF A DRIVER OF A VEHICLE

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Sergei Avedisov, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 242 days.

(21) Appl. No.: 17/859,701

(22) Filed: Jul. 7, 2022

(65) Prior Publication Data
US 2024/0010205 A1 Jan. 11, 2024

(51) Int. Cl.
| | |
|---|---|
| *B60W 40/09* | (2012.01) |
| *B60W 40/04* | (2006.01) |
| *B60W 50/14* | (2020.01) |
| *G05B 17/02* | (2006.01) |

(52) U.S. Cl.
CPC ............ *B60W 40/09* (2013.01); *B60W 40/04* (2013.01); *B60W 50/14* (2013.01); *G05B 17/02* (2013.01); *B60W 2050/146* (2013.01); *B60W 2540/20* (2013.01); *B60W 2540/30* (2013.01)

(58) Field of Classification Search
CPC ...... B60W 40/09; B60W 40/04; B60W 50/14; B60W 2050/146; B60W 2540/20; B60W 2540/30; G05B 17/02
See application file for complete search history.

(56) References Cited

U.S. PATENT DOCUMENTS

| | | | |
|---|---|---|---|
| 10,565,893 B2 | 2/2020 | McQuade et al. | |
| 2019/0228571 A1* | 7/2019 | Atsmon | G01C 21/3826 |
| 2021/0272394 A1 | 9/2021 | Cella | |
| 2021/0316750 A1 | 10/2021 | Jo | |
| 2022/0080977 A1 | 3/2022 | Ucar et al. | |
| 2022/0204020 A1* | 6/2022 | Misu | B60W 60/001 |
| 2022/0381571 A1* | 12/2022 | Shibuya | G01C 21/3484 |

FOREIGN PATENT DOCUMENTS

| | | |
|---|---|---|
| CN | 202939770 U | 5/2013 |
| CN | 113165665 A | 7/2021 |
| CN | 109318894 B | 9/2021 |
| JP | 2007164525 A | 6/2007 |

* cited by examiner

*Primary Examiner* — Jacob M Amick
(74) *Attorney, Agent, or Firm* — Dinsmore & Shohl LLP

(57) ABSTRACT

Systems, methods, and vehicles for correcting driving behavior of a driver of a vehicle are provided. The systems include a controller programmed to identify a repetitive movement pattern of a driver of a vehicle at a predetermined location based on accumulated driving data of the vehicle, implement digital twin simulation of the vehicle using the repetitive movement pattern and the digital twin simulation of another object to identify a potential conflict between the vehicle and the another object, and inform the driver of the vehicle about predetermined driving behavior in response to identifying the potential conflict.

20 Claims, 9 Drawing Sheets

SYSTEMS, METHODS, AND VEHICLES FOR CORRECTING DRIVING BEHAVIOR OF A DRIVER OF A VEHICLE

TECHNICAL FIELD

The present disclosure relates to systems, methods, and vehicles for correcting driving behavior of a driver of a vehicle.

BACKGROUND

Drivers generally exhibit driving behavior (e.g., backward parking, U-turn) that they think it is correct or legal. Such driving behaviors can be reinforced through repetition, and they become driving habits. However, in the presence of other objects (e.g., vehicles') these driving behaviors, habits, or both, (e.g., following speed limits, following maneuver rules, or both) can lead to undesirable situations.

Conventional systems and methods may correct these driving behaviors through driver coaching and abnormal driving detection studies. For example, conventional systems and methods look for an indicator in which the indicator is a type of abnormal driving that exceeds the predefined limits. However, in such cases, the drivers may not have enough time to correct their driving behavior. Furthermore, in some cases, conventional systems and methods may not detect any abnormal driving. For example, when the drivers are following speed limits, conventional systems and methods may not detect any abnormal driving.

Accordingly, a need exists for systems, methods, and vehicles that mitigate undesirable situations caused by driving behaviors that drivers think they are correct or legal.

SUMMARY

The present disclosure provides systems, methods, and vehicles for correcting driving behavior of a drive of a vehicle, which mitigate undesirable situations caused by driving behaviors by observing and correcting driving behaviors of drivers before potential conflicts between the vehicle and another object. The systems, methods, and vehicles identify a repetitive movement pattern of a driver of a vehicle at a predetermined location regardless of following speed limits, maneuver rules, or both. Thus, the systems, methods, and vehicles may detect abnormal driving behaviors even if the driver follows speed limits, maneuver rules, or both. Accordingly, the systems, methods, and vehicles may inform the driver about the correct or legal driving behavior before any abnormal events, such as vehicle collisions, happen, and thereby reduce potential conflicts, such as vehicle collisions.

In one embodiment, a system for correcting driving behavior of a drive of a vehicle is provided. The system includes a controller programmed to identify a repetitive movement pattern of a driver of a vehicle at a predetermined location based on accumulated driving data of the vehicle, implement digital twin simulation of the vehicle using the repetitive movement pattern and the digital twin simulation of another object to identify a potential conflict between the vehicle and the another object, and inform the driver of the vehicle about predetermined driving behavior in response to identifying the potential conflict.

In another embodiment, a method for correcting driving behavior of a drive of a vehicle is provided. The method includes accumulating a repetitive movement pattern of a driver of a vehicle at a predetermined location, implementing digital twin simulation of the vehicle using the repetitive movement pattern and the digital twin simulation of another object to identify a potential conflict between the vehicle and the another object, and informing the driver of the vehicle about predetermined driving behavior in response to identifying the potential conflict.

In yet another embodiment, a vehicle for correcting driving behavior of a drive of a vehicle is provided. The vehicle includes an actuator, a controller, and an output device. The actuator is configured to move the vehicle. The controller is programmed to identify a repetitive movement pattern of a driver of a vehicle at a predetermined location based on accumulated driving data of the vehicle, implement digital twin simulation of the vehicle using the repetitive movement pattern and the digital twin simulation of another object to identify a potential conflict between the vehicle and the another object in response to identifying the vehicle proximate to the predetermined location, and transmit predetermined driving behavior to an output device in response to identifying the potential conflict. The output device is configured to output the predetermined driving behavior.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and vehicles for correcting driving behavior of a driver of a vehicle, which mitigate dangerous situations caused by driving behaviors by observing and correcting driving behaviors of drivers before potential conflicts between the vehicle and an another object.

FIGS. 1A, 1B, 1C, 1D, and 1E schematically depict an exemplary embodiment of correcting driving behavior of a driver of a vehicle where the repetitive movement pattern is related to backward parking movement pattern, in accordance with one or more embodiments shown and described herewith.

Referring to FIGS. 1A-1E, the vehicle 100 may identify a repetitive movement pattern 102 of a driver of the vehicle 100 at a predetermined location based on accumulated driving data of the vehicle 100. The vehicle 100 accumulates the repetitive movement pattern 102 to define predetermined driving behavior. The vehicle 100 may store driving trajectories using sensors such as GPS sensors, and if there are multiple driving trajectories that are similar to each other within a certain period of time, the vehicle 100 may identify the multiple driving trajectories as a repetitive movement pattern. In some embodiments, the vehicle 100 may transmit the identified repetitive movement pattern to the server 140. In some embodiments, the vehicle 100 may transmit its trajectories to the server 140 and the server 140 may identify the repetitive movement pattern of the vehicle 100. In FIGS. 1A-1E, the repetitive movement pattern 102 is related to a parking movement pattern, and the predetermined location includes parking spot 104. The vehicle 100 may be a vehicle including an automobile or any other passenger or non-passenger vehicle such as, for example, a terrestrial, aquatic, and/or airborne vehicle. The vehicle 100 may be an autonomous and connected vehicle that navigates its environment with limited human input or without human input. The vehicle 100 may be equipped with internet access and share data with other devices both inside and outside the vehicle 100. The vehicle 100 may communicate with the server 140 and transmit its data to the server 140. For example, the vehicle 100 transmits information about its repetitive driving patterns, its current location and destination, information about a current driver, information about a task that it is currently implementing, and the like.

The vehicle 100 may include an actuator configured to move the vehicle 100. The vehicle 100 may include the output device configured to output the predetermined driving behavior of the driver. In embodiments, the output device of the vehicle 100 may include a smartphone, a smartwatch, a laptop, a tablet computer, a personal computer, and a wearable device, or combinations thereof.

Figure 1A:
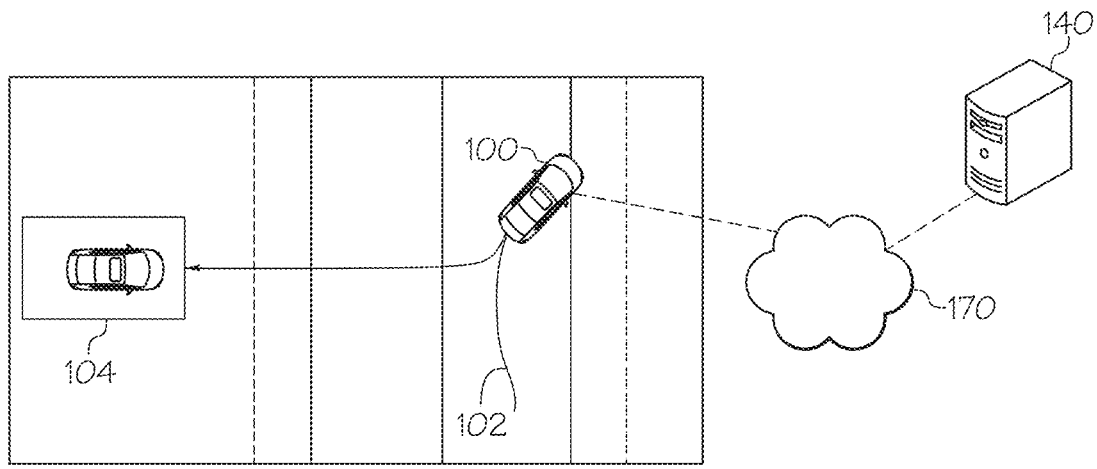
FIGS. 1A, 1B, 1C, 1D, and 1F schematically depict an exemplary embodiment of correcting driving behavior of a driver of a vehicle where the repetitive movement pattern is related to backward parking movement pattern, in accordance with one or more embodiments shown and described herewith.

FIG. 1A depicts collecting a repetitive movement pattern of backward parking of a vehicle in the real world, according to one embodiment shown and described herein. Referring to FIG. 1A, the vehicle 100 may be parked backward with the repetitive movement pattern 102. The vehicle 100 may turn on left turn signals for backward parking, and then veer to the right to the line-up. The vehicle 100 may move backward and be parked backward in parking spot 104. In embodiments, when the repetitive movement pattern 102 is related to backward parking movement pattern, the repetitive movement pattern 102 may include turning on the left signal, veering to the right to the line-up, and moving backward to the parking spot 104. The driver of the vehicle 100 may think that this repetitive movement pattern 102 is correct or legal. In embodiments, the server 140 may collect, receive, or both, the repetitive movement pattern 102 of the vehicle 100. The server 140 may be communicatively coupled to the vehicle 100 via a network 170.

Figure 1B:
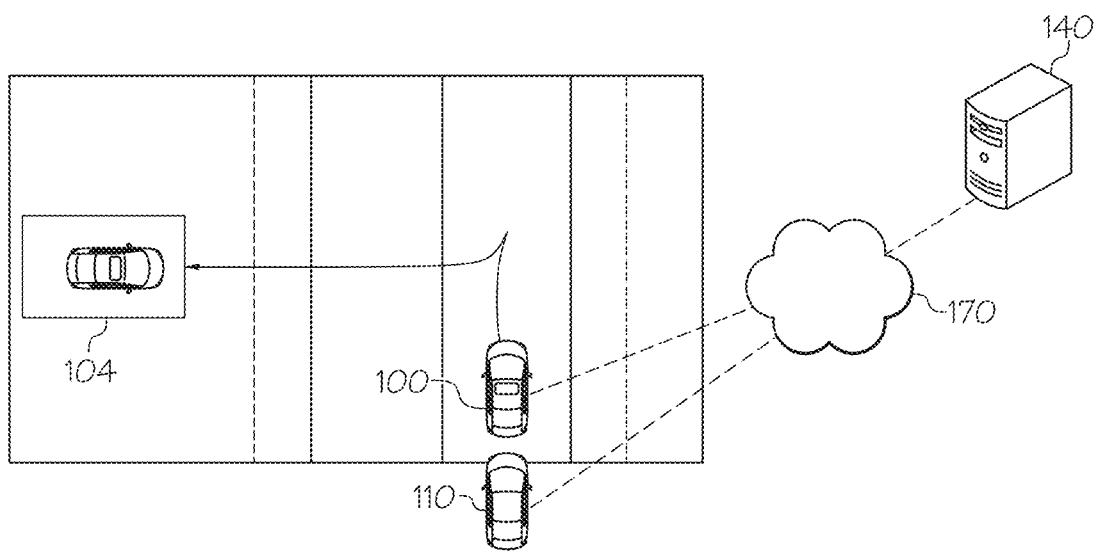

FIG. 1B depicts a vehicle that is about to initiate the repetitive movement pattern of the backward parking in the real world, according to one embodiment shown and described herein. Referring to FIG. 1B, another object 110 may come up behind the vehicle 100. In embodiments, another object 110 may be another vehicle. The vehicle 100 may detect another object 110 within a predetermined distance of the vehicle 100. The predetermined distance of the vehicle 100 may depend on the speed of vehicle 100, the size of vehicle 100, the speed of another object 110, the size of another object 110, or combinations thereof.

In this example, if the vehicle 100 repeats the repetitive movement pattern 102 of the backward parking, the repeated movement may cause a potential conflict with another object 110, Specifically, when the vehicle 100 turns on left turn signals for backward parking, another object 110 may veer to the right to pass the vehicle 100. Simultaneously, the vehicle 100 may veer to the right to line up for backward parking. These movements may cause a potential conflict between the vehicle 100 and another object 110.

Figure 1C:
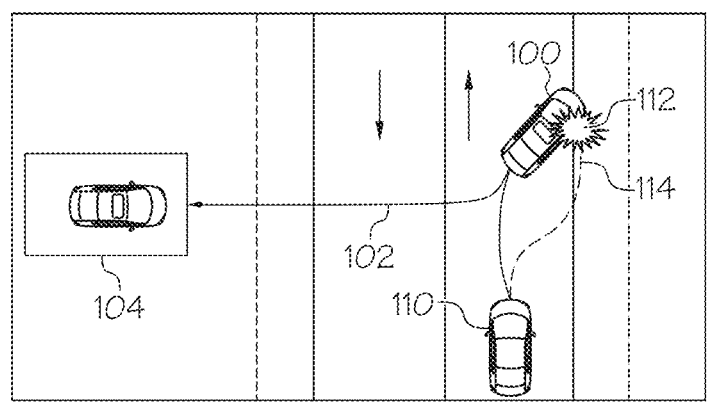
Figure 1D:
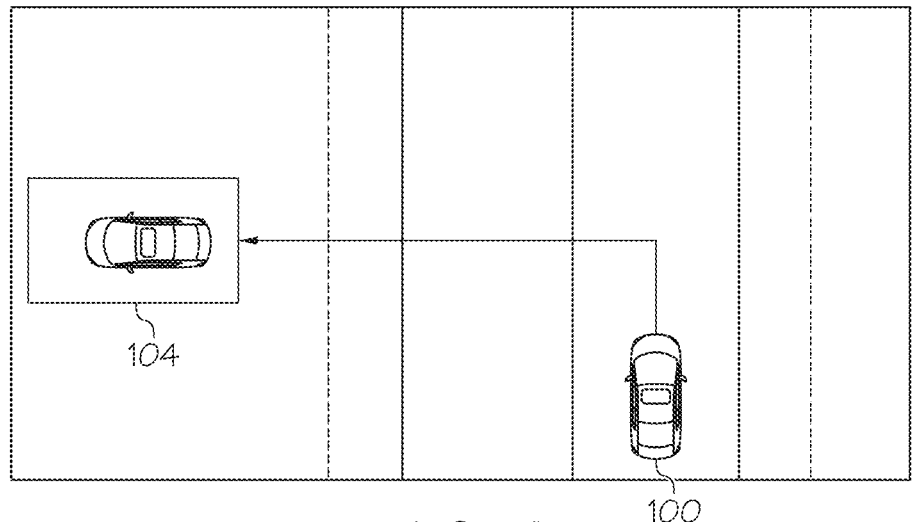
Figure 1E:
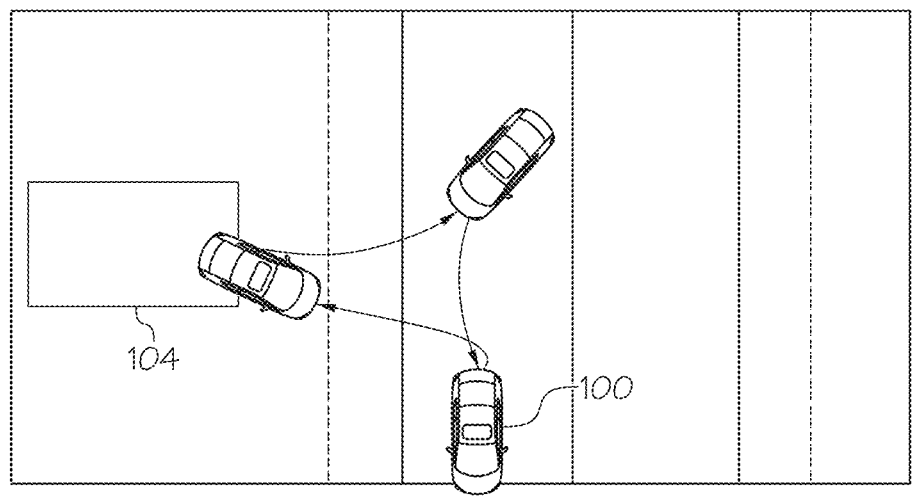

Thus, before the vehicle 100 initiates the repetitive movement pattern of the backward parking, the vehicle 100 may conduct a digital twin simulation to confirm a potential conflict as illustrated in FIG. 1C, and take preventive measures as illustrated in FIGS. 1D and 1E.

FIG. 1C depicts a digital twin simulation of the vehicle and another vehicle, according to one embodiment shown and described herein. Referring to FIG. 1C, the vehicle 100 implements digital twin simulation of the vehicle 100 using the repetitive movement pattern 102 and digital twin simulation of another object 110 to identify this potential conflict 112 between the vehicle 100 and another object 110. In some embodiments, the server 140 may implement the digital twin simulation of the vehicle 100 using the repetitive movement pattern 102 and digital twin simulation of another object 110. A digital twin simulation may be a simulated version of a specific real-world vehicle, object, or both, that exist in a simulation. A structure, condition, behavior, and responses of the digital twin are similar to a structure, condition, behavior, and responses of the specific real-world vehicles, objects, or both, that the digital twin represents in the simulation. The digital environment included in the simulation is similar to the real-world roadway environment of the real-world vehicles, and objects (e.g., the vehicle 100, another object 110, other vehicles or objects in the roadway environment). In embodiments, the vehicle 100 or the server 140 may include a simulation software executing digital twin simulation. The simulation software may include code and routines that are operable to execute simulations based on digital twins of real-world vehicles, objects, or both, in the roadway environment.

In embodiments, when the vehicle 100 detects another object 110 within a predetermined distance of the vehicle 100 as illustrated in FIG. 1B, the vehicle 100 implements the digital twin simulation of the vehicle 100 using the repetitive movement pattern 102 and the digital twin simulation of another object 110 to identify a potential conflict 112 between the vehicle 100 and another object 110 in response to identifying the vehicle 100 proximate to the predetermined location and detecting another object 110 within the predetermined distance of the vehicle 100. Specifically, in the simulation, the vehicle 100 follows the repetitive movement pattern 102 and another object 110 follows a route 114. Then, a conflict 112 occurs between the repetitive movement pattern 102 and the route 114.

Referring to FIGS. 1D and 1E, after the simulation, the vehicle 100 in the real world may inform the driver of the vehicle 100 about predetermined driving behavior that may prevent the potential conflict in response to identifying the potential conflict 112. In embodiments, the vehicle 100 may display the predetermined driving behavior. For example, the screen of vehicle 100 may display the predetermined driving behavior. In some embodiments, the predetermined driving behavior may be displayed on a device other than the device of the vehicle 100, e.g., a smartphone, a smartwatch, a laptop, a tablet computer, a personal computer, and a wearable device, or combinations thereof. In some embodiments, the vehicle 100 may display a result of the digital twin simulation of the vehicle 100 and another object 110 showing the potential conflict 112, e.g. the digital twin simulation illustrated in FIG. 1C.

In embodiments, the vehicle 100 or the server 140 may instruct a device of another object 110 to output an alert. In embodiments, the device of another object 110 may include a smartphone, a smartwatch, a laptop, a tablet computer, a personal computer, and a wearable device, or combinations thereof in embodiments, the vehicle 100 or the server 140 may instruct a device of another object 110 to output an alert with a result of the digital twin simulation of the vehicle 100 and another object 110 showing the potential conflict 112.

Referring to FIG. 1D, when there is a potential conflict 112 between the vehicle 100 and another object 110, the vehicle 100 may instruct the driver of the vehicle 100 to park the vehicle 100 forward-looking. In embodiments, the output device of the vehicle 100 may display a result of the digital twin simulation of the vehicle 100 and another object 110 showing the potential conflict 112, which is shown in FIG. 1C. In some embodiments, when there is a potential conflict 112 between the vehicle 100 and another object 110, the controller may explore more and infer correct driving behavior at a predetermined location. For example, the controller may check a Department of Motor Vehicles (DMV) manual for a parking and retrieve a correct driving behavior. In some embodiments, when there is a potential conflict 112 between the vehicle 100 and another object 110, the controller may get the information about correct driving behavior from other drivers. For example, the controller may show a potential conflict 112 between the vehicle 100 and another object 110 to other drivers, and other drivers may deliver information about correct driving behavior to the driver of the vehicle 100.

Referring to FIG. 1E, when there is a potential conflict 112 between the vehicle 100 and another object 110, the vehicle 100 may instruct the driver of the vehicle 100 to park the vehicle 100 backward without veering to the right as shown in FIG. 1A. The vehicle 100 may instruct the driver of the vehicle 100 to reverse the vehicle 100 in the nearest lane for backward parking when there is no other object in the nearest lane. When there is no potential conflict 112 between the vehicle 100 and other object, the vehicle 100 may not instruct the driver of the vehicle 100 to park the vehicle 100 forward-looking, and the driver of the vehicle 100 may park the vehicle 100 backward with the driver's driving behaviors described in FIG. 1A. In embodiments, the display of an output device of the vehicle 100 may display a result of the digital twin simulation of the vehicle 100 and another object 110 showing the potential conflict 112, which is shown in FIG. 1C.

Figure 2:
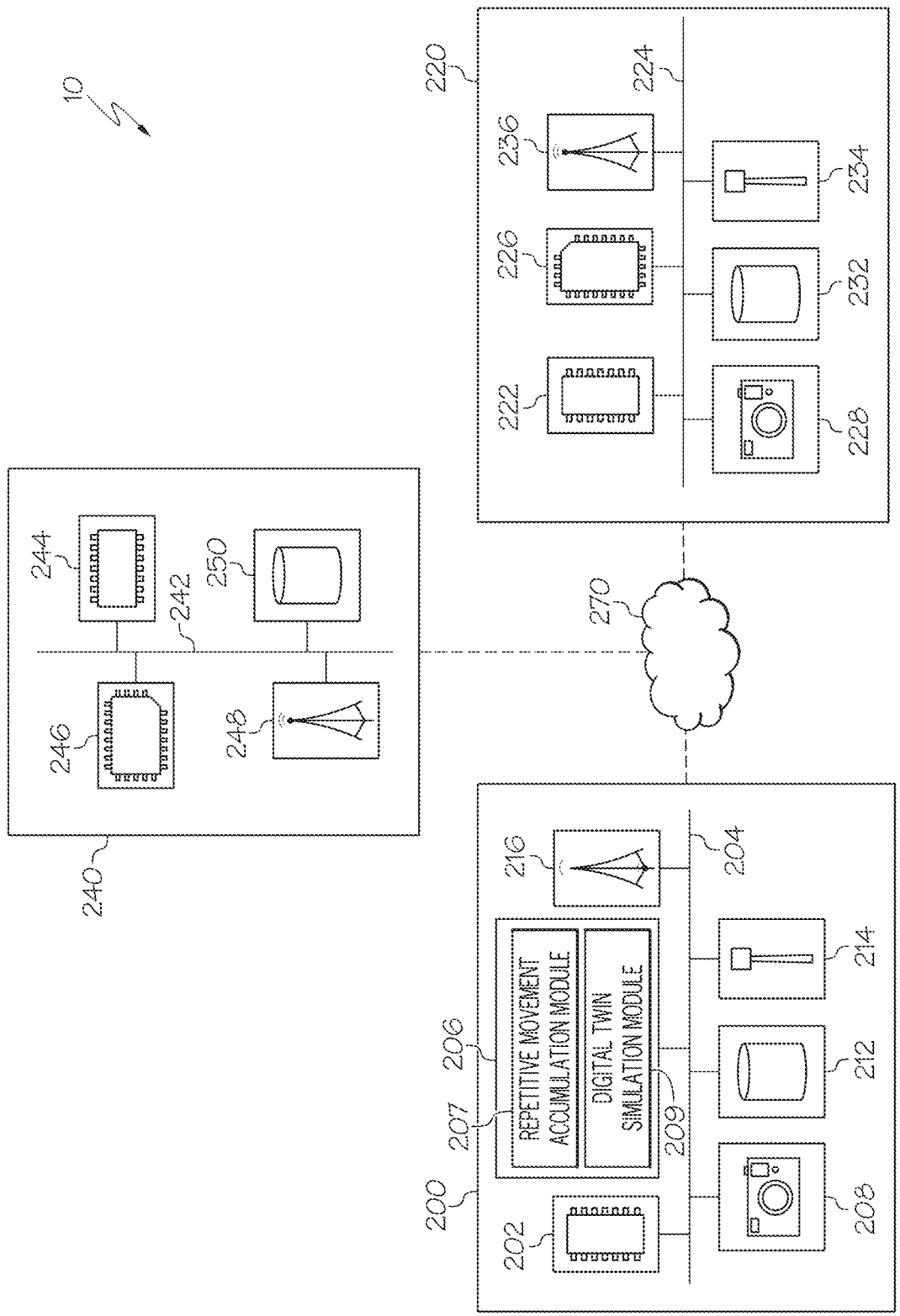
FIG. 2 depicts a schematic diagram of a system for correcting driving behavior of a driver of a vehicle, according to one or more embodiments shown and described herein.

FIG. 2 depicts a schematic diagram of a system for correcting driving behavior of a drive of a vehicle, according to one or more embodiments shown and described herein. The system 10 includes a vehicle system 200, another object system 220, and a server 240.

It is noted that, while FIG. 2 depicts that the vehicle system 200 communicates with one another object system 220, and the vehicle system 200 may communicate with more than one another object system 220. In embodiments, each of the vehicle system 200 and another object system 220 may be included within a vehicle that may be an automobile or any other passenger or non-passenger vehicle such as, for example, a terrestrial, aquatic, and/or airborne vehicle. In some embodiments, the vehicle may be an autonomous vehicle that navigates its environment with limited human input or without human input.

The vehicle system 200 includes one or more processors 202. Each of the one or more processors 202 may be any device capable of executing machine-readable and executable instructions. Each of the one or more processors 202 may be a controller, an integrated circuit, a microchip, a computer, or any other computing device. The one or more processors 202 are coupled to a communication path 204 that provides signal interconnectivity between various modules of the system. The communication path 204 may communicatively couple any number of processors 202 with one another, and allow the modules coupled to the communication path 204 to operate in a distributed computing environment. Each of the modules may operate as a node that may send and/or receive data. As used herein, the term "communicatively coupled" means that coupled components are capable of exchanging data signals with one another such as, electrical signals via a conductive medium, electromagnetic signals via air, and optical signals via optical waveguides, and the like.

The communication path 204 may be formed from any medium that is capable of transmitting a signal such as, conductive wires, conductive traces, optical waveguides, or the like. In some embodiments, the communication path 204 may facilitate the transmission of wireless signals, such as Wifi, Bluetooth®, Near Field Communication (NFC), and the like. The communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. The communication path 204 may comprise a vehicle bus, such as, a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine-readable and executable instructions such that the machine-readable and executable instructions can be accessed by the one or more processors 202. The machine-readable and executable instructions may comprise logic or algorithm(s) written in any programming language of any generation (e.g., 1 GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory modules 206. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 202 along with the one or more memory modules 206 may operate as a controller for the vehicle system 200.

The one or more memory modules 206 includes a repetitive movement accumulation module 207 and a digital twin simulation module 209. The repetitive movement accumulation module 207 and the digital twin simulation module 209 work together or independently to correct driving behavior. Each of the repetitive movement accumulation module 207 and the digital twin simulation module 209 may be a program module in the form of operating systems, application program modules, and other program modules stored in one or more memory modules 206. In some embodiments, the program module may be stored in a remote storage device that may communicate with the vehicle system 200, for example, in a cloud server or an edge server. Such a program module may include, but is not limited to, routines, subroutines, programs, objects, components, data structures, and the like for performing specific tasks or executing specific data types as will be described below.

In embodiments, the repetitive movement accumulation module 207 identifies a repetitive movement pattern of a driver of a vehicle at a predetermined location based on accumulated driving data of the vehicle. By referring to FIG. 1A, the repetitive movement accumulation module 207 identifies the repetitive movement pattern 102 including turning on the left signal, veering to the right to the line-up, and moving backward to the parking spot 104. For example, by referring to FIG. 4A, the repetitive movement accumulation module 207 identifies the repetitive movement pattern 402 including turning on the left signal, veering to the right to have more space, and making a U-turn. For example, by referring to FIG. 5A, the repetitive movement accumulation module 207 identifies the repetitive movement pattern 502 including parking at a merging lane.

In embodiments, the digital twin simulation module 209 implements a digital twin simulation of the vehicle using the repetitive movement pattern and the digital twin simulation of another object to identify a potential conflict between the vehicle and another object. Once the digital twin simulation module 209 implements a digital twin simulation of the vehicle using the repetitive movement pattern and the digital twin simulation of another object to identify a potential conflict between the vehicle and another object, the digital twin simulation module 209, may transmit an instruction to inform the driver of the vehicle about predetermined driving behavior in response to identifying the potential conflict.

Still referring to FIG. 2, the vehicle system 200 includes one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of other object, such as another object 110 in FIGS. 1A-1C, the distance between the vehicle 100 and another object 110, or both. The one or more sensors 208 may have any resolution. In some embodiments, one or more optical components, such as a mirror, fish-eye lens, or any other type of lens may be optically coupled to the one or more sensors 208. In some embodiments, the one or more sensors 208 may provide image data to the one or more processors 202 or another component communicatively coupled to the communication path 204. In some embodiments, the one or more sensors 208 may provide navigation support. In embodiments, data captured by the one or more sensors 208 may be used to autonomously or semi-autonomously navigate the vehicle 100.

In some embodiments, the one or more sensors 208 include one or more imaging sensors configured to operate in the visual and/or infrared spectrum to sense visual and/or infrared light. In some embodiments, the one or more sensors 208 include one or more HDAR sensors, radar sensors, sonar sensors, or other types of sensors for gathering data that could be integrated into or supplement the data collection. Ranging sensors like radar sensors may be used to obtain rough depth and speed information for the view of the vehicle system 200.

The vehicle system 200 includes a satellite antenna 214 coupled to the communication path 204 such that the communication path 204 communicatively couples the satellite antenna 214 to other modules of the vehicle system 200. The satellite antenna 214 is configured to receive signals from global positioning system satellites. In one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The vehicle system 200 includes one or more vehicle sensors 212. Each of the one or more vehicle sensors 212 are coupled to the communication path 204 and communicatively coupled to the one or more processors 202. The one or more vehicle sensors 212 may include one or more motion sensors for detecting and measuring motion and changes in the motion of the vehicle 100. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. Based on the signal indicative of an orientation, a rotation, a velocity, or an acceleration of the vehicle, the repetitive movement accumulation module 207 may identify a repetitive movement pattern of the vehicle.

Still referring to FIG. 2, the vehicle system 200 includes a network interface hardware 216 for communicatively coupling the vehicle system 200 to another object system 220. The network interface hardware 216 may be communicatively coupled to the communication path 204 and may be any device capable of transmitting and/or receiving data via a network. The network interface hardware 216 may include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the vehicle system 200 may transmit its data to another object system 220. For example, the network interface hardware 216 of the vehicle system 200 may transmit vehicle data, location data, maneuver data, and the like to other objects, a cloud server, edge servers, and the like.

The vehicle system 200 may connect with one or more external vehicle systems (e.g., another object system 220) and/or external processing devices (e.g., a cloud server, or an edge server) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The vehicle system 200 may communicate with external communicate vehicle systems using wireless messages such as basic safety messages (BSMs), maneuver messages (MDIs), and the like. BSM is a wireless message transmitted between vehicles where the transmitter sends its position, speed, and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

Vehicles may function as infrastructure nodes to form a mesh network and connect dynamically on an ad-hoc basis. In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using centralized servers and other central computing devices to store and/or relay information between vehicles.

Still referring to FIG. 2, the vehicle system 200 may be communicatively coupled to another object system 220 or the server 240 by the network 270. In one embodiment, the network 270 may include one or more computer networks (e.g., a personal area network, a local area network, or a wide area network), cellular networks, satellite networks and/or a global positioning system and combinations thereof. The vehicle system 200 may be communicatively coupled to the network 270 via a wide area network, via a local area network, via a personal area network, via a cellular network, via a satellite network, etc. Suitable local area networks may include wired Ethernet and/or wireless technologies such as, Wi-Fi. Suitable personal area networks may include wireless technologies such as, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, another object system 220 includes one or more processors 222, one or more memory modules 226, one or more sensors 228, one or more vehicle sensors 232, a satellite antenna 234, a network interface hardware 236, and a communication path 224 communicatively connected to the other components of another object system 220. The components of another object system 220 may be structurally similar to and have similar functions as the corresponding components of the vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, and the network interface hardware 236 corresponds to the network interface hardware 216). The one or more memory modules 226 may store a repetitive movement accumulation module and a digital twin simulation module similar to the repetitive movement accumulation module 207 and the digital twin simulation module 209 of the vehicle system 200.

Still referring to FIG. 2, the server 240 includes one or more processors 244, one or more memory modules 246, a network interface hardware 218, one or more vehicle sensors 250, and a communication path 242 communicatively connected to the other components of the vehicle system 200 and/or the other components of another object system 220. The components of the server 240 may be structurally similar to and have similar functions as the corresponding components of another object system 220 (e.g., the one or more processors 244 corresponds to the one or more processors 222, the one or more memory modules 246 corresponds to the one or more memory modules 226, the one or more vehicle sensors 250 corresponds to the one or more vehicle sensors 232, the communication path 242 corresponds to the communication path 224, and the network interface hardware 248 corresponds to the network interface hardware 236).

It should be understood that the components illustrated in FIG. 2 are merely illustrative and are not intended to limit the scope of this disclosure. More specifically, while the components in FIG. 2 are illustrated as residing within vehicle system 200, this is a non-limiting example. In some embodiments, one or more of the components may reside external to the vehicle system 200, such as with the server 240.

Figure 3:
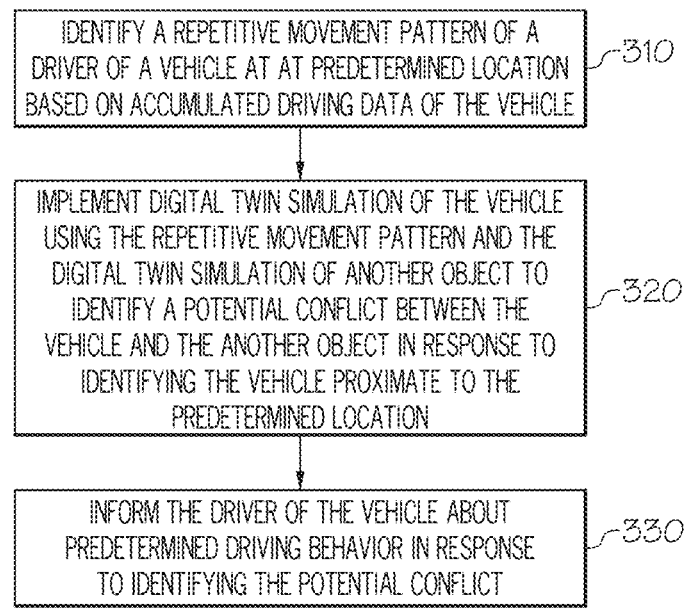
FIG. 3 depicts a flowchart for a method of correcting driving behavior of a driver of a vehicle, according to one or more embodiments shown and described herein.

Referring now to FIG. 3, a flowchart of a method 300 that may be performed by the vehicle 100, another object 110, the server 140, or combinations thereof, of FIGS. 1A-1E is depicted.

In step 310, a controller identifies a repetitive movement pattern of a driver of a vehicle at a predetermined location. In some embodiments, a controller identifies a repetitive movement pattern of an autonomous driver of a vehicle at a predetermined location. The controller may be the controller of the vehicle or the controller of the server. The controller may accumulate driving data of the vehicle and identify a repetitive movement pattern of the driver of the vehicle based on the accumulated driving data. By referring to FIG. 1A, the repetitive movement pattern 102 is related to a parking movement pattern, and the predetermined location includes parking spot 104 or a home address. The repetitive movement pattern 102 may include turning on the left signal, veering to the right to the line-up, and moving backward to the parking spot 104. For example, by referring to FIG. 4A, the repetitive movement pattern 402 is related to a turning movement pattern, such as a U-turn movement pattern, and the predetermined location includes a turning spot, such as a U-turn spot. The repetitive movement pattern 402 may include turning on the left signal, veering to the right to have more space, and making a U-turn. For example, by referring to FIG. the repetitive movement pattern 502 is related to a parking movement pattern, and the predetermined location includes a merging lane. The repetitive movement pattern 502 may include parking at a merging lane.

Referring back to FIG. 3, in step 320, the controller implements the digital twin simulation of the vehicle using the repetitive movement pattern and the digital twin simulation of another object to identify a potential conflict between the vehicle and another object in response to identifying the vehicle proximate to the predetermined location. The controller may run the digital twin simulation of the vehicle in real-time or at the end of the day when the controller is not busy. Then, the controller may infer a coaching guidance, such as predetermined driving behavior, to the driver of the vehicle. For example, by referring to FIGS. 1B-1C, when the vehicle 100 detects another object 110 within a predetermined distance of the vehicle 100, i.e, the vehicle 100 is proximate to parking spot 104 and another object 110 is detected nearby, the vehicle 100 may implement the digital twin simulation of the vehicle 100 using the repetitive movement pattern 102 and the digital twin simulation of another object 110 to identify this potential conflict 112 between the vehicle 100 another object 110. As another example, when the vehicle 100 turns on the left turn signal and is proximate to the predetermined distance, the vehicle 100 may receive an indication of a turn signal of a vehicle being turned on and then implement the digital twin simulation of the vehicle 100 using the repetitive movement pattern 102 and the digital twin simulation of another object 110 to identify this potential conflict 112 between the vehicle 100 another object 110.

Figure 4A:
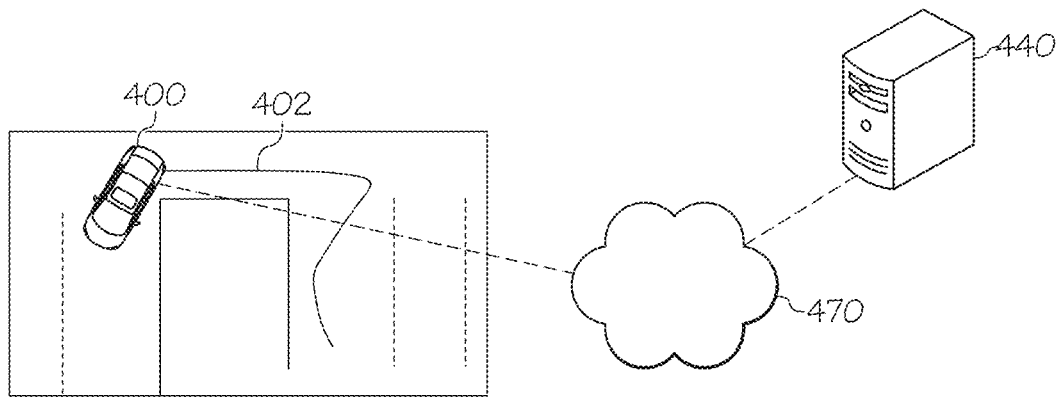
FIGS. 4A, 4B, 4C, 4D, 4E, and 4F schematically depict an exemplary embodiment of correcting driving behavior of a driver of a vehicle where the repetitive movement pattern is related to a U-turn movement pattern, in accordance with one or more embodiments shown and described herewith.
Figure 4B:
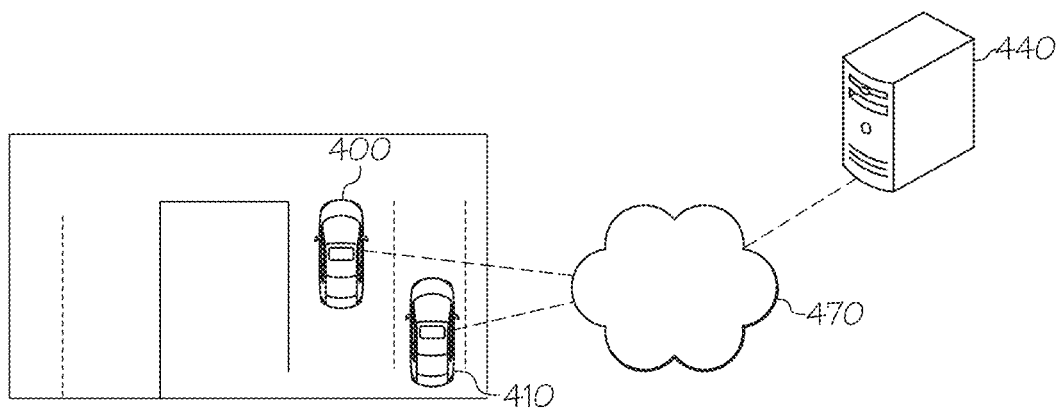
Figure 4C:
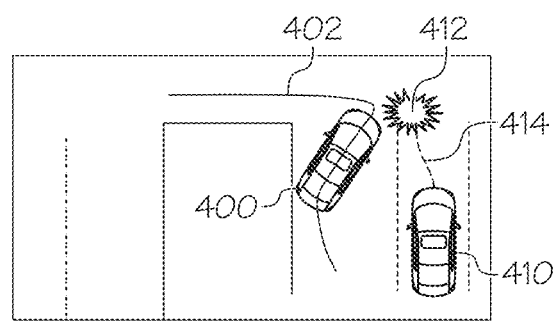

In some embodiments, by referring FIGS. 4B-4C, when the vehicle 400 detects another object 410 within a predetermined distance of the vehicle 400, i.e., the vehicle 400 is proximate to a U-turn spot and another object 410 is detected nearby, the vehicle 400 may implement the digital twin simulation of the vehicle 400 using the repetitive movement pattern 402 and the digital twin simulation of another object 410 to identify this potential conflict 412 between the vehicle 400 and another object 410. As another example, when the vehicle 400 turns on the left turn signal for a U-turn, the vehicle 400 may receive an indication of a turn signal of a vehicle being turned on and then implement digital twin simulation of the vehicle 400 using the repetitive movement pattern 402 and digital twin simulation of another object 410 to identify this potential conflict 412 between the vehicle 400 and another object 410.

Figure 5A:
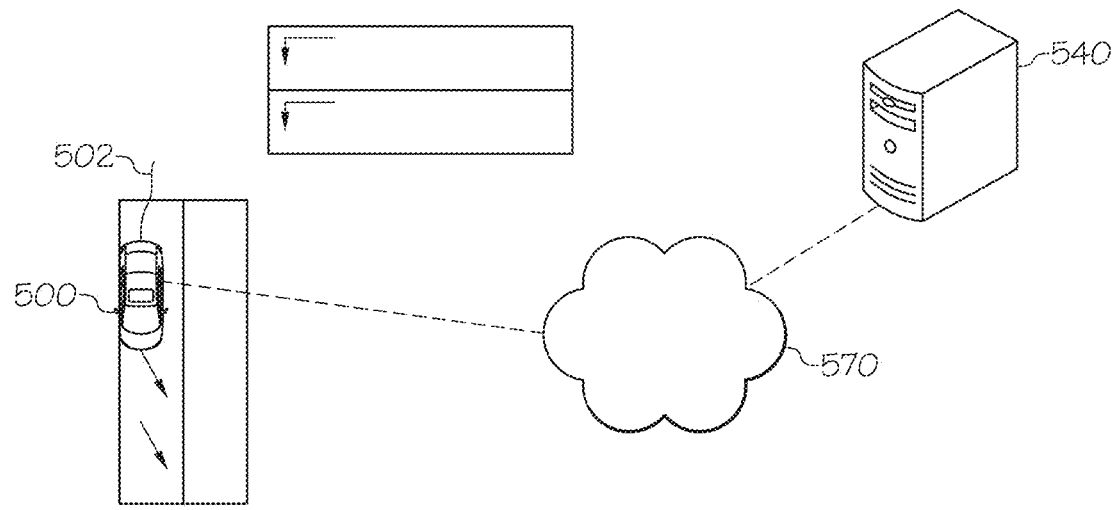
FIGS. 5A, 5B, 5C, and 5D schematically depict an exemplary embodiment of correcting driving behavior of a driver of a vehicle where the repetitive movement pattern is related to a parking movement pattern, in accordance with one or more embodiments shown and described herewith.
Figure 5B:
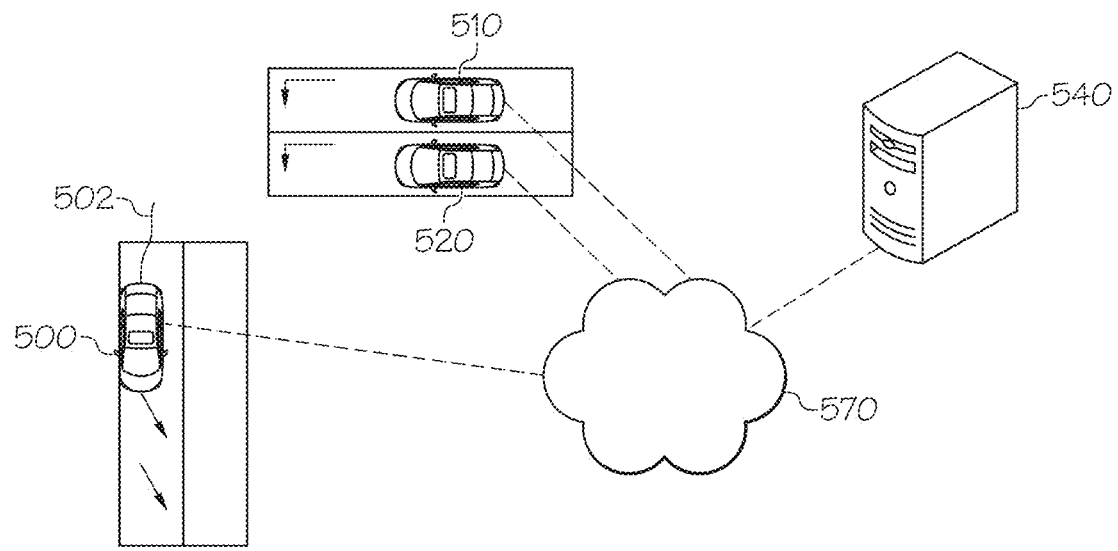
Figure 5C:
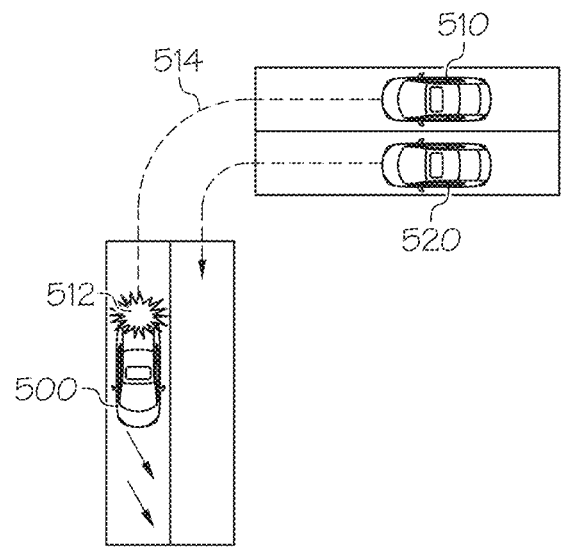

In some embodiments, by referring to FIGS. 5B-5C, when the vehicle 500 detects a first another object 510 within a predetermined distance of the vehicle 500, i.e., the vehicle 500 is proximate to a merging lane for parking and the first another object 510 and the second another object 520 are detected nearby, the vehicle 500 may implement digital twin simulation of the vehicle 500 using the repetitive movement pattern 502 and digital twin simulation of the first another object 510 and the second another object 520 to identify this potential conflict 512 between the vehicle 500 and the first another object 510. As another example, when the vehicle 500 turns on the left turn signal, the right turn signal, or the emergency light for parking in a merging lane, the vehicle 500 may receive an indication of a turn signal or an emergency light signal of a vehicle being turned on and then implement digital twin simulation of the vehicle 500 using the repetitive movement pattern 502 and digital twin simulation of the first another object 510 and the second another object 520 to identify this potential conflict 512 between the vehicle 500 and the first another object 510.

Referring back to FIG. 3, in step 330, the controller informs the driver of the vehicle about predetermined driving behavior in response to identifying the potential conflict. The predetermined driving behavior may refer the driving behavior that may prevent the potential conflict between the vehicle and another object. In embodiments, the controller may instruct a display of an output device of the vehicle, a display of a device of the driver, or both, to display the predetermined driving behavior. In embodiments, the output device of the vehicle, the device of the driver, or both, may include a smartphone, a smartwatch, a laptop, a tablet computer, a personal computer, and a wearable device, or combinations thereof. In embodiments, the controller may instruct a display of an output device of the vehicle to display a result of the digital twin simulation of the vehicle and another object showing the potential conflict. In embodiments, the controller may instruct a device of another object to output an alert. For example, by referring to FIGS. 1C-1E, when there is a potential conflict 112 between the vehicle 100 and another object 110, the controller instructs an output device of the vehicle 100 to guide the driver of the vehicle 100 to park the vehicle 100 forward-looking. Specifically, the output device of the vehicle 100 may display predetermined driving behavior, i.e., forward-looking parking as illustrated in FIG. 1D. As another example, when there is a potential conflict 112 between the vehicle 100 and another object 110, the controller instructs an output device of the vehicle 100 to guide the driver of the vehicle 100 to park the vehicle 100 backward without veering to the right. Specifically, the output device of the vehicle 100 may display predetermined driving behavior, i.e., parking backward without veering to the right as illustrated in FIG. 1E.

Figure 4D:
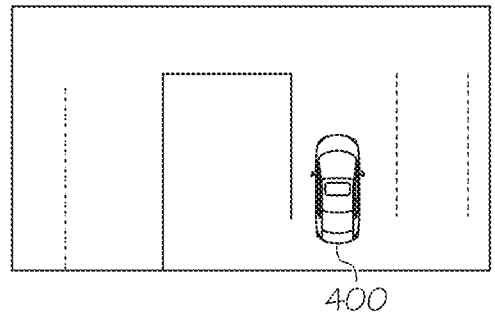

In some embodiments, by referring to FIGS. 4C-4D, when there is a potential conflict 412 between the vehicle 400 and another object 410, the controller instructs an output device of the vehicle 400 to guide the driver of the vehicle 400 to keep the vehicle 400 straight, turn the wheels of the vehicle 400 without crossing the next lane, and complete a U-turn without swerving, Specifically, the output device of the vehicle 400 may display predetermined driving behavior, i.e., keeping the vehicle 400 straight, turning the wheels of the vehicle 400 without crossing the next lane, and completing a U-turn without swerving, as illustrated in FIG. 4D.

Figure 5D:
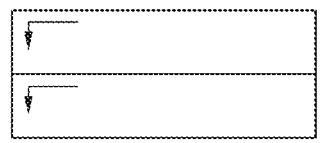

For example, by referring to FIGS. 5C-5D, when there is a potential conflict 512 between the vehicle 500 and the first another object 510, the controller instructs an output device of the vehicle 500 to guide the driver of the vehicle 500 not to park in a merging lane. Specifically, the output device of the vehicle 500 may display predetermined driving behavior, i.e., not parking in a merging lane as illustrated in FIG. 5D.

Referring now to FIGS. 4A, 4B, 4C, 4D, 4E, and 4F, an exemplary embodiment of correcting driving behavior of a driver of a vehicle where the repetitive movement pattern is related to a U-turn movement pattern is depicted.

FIG. 4A depicts collecting a repetitive movement pattern of a U-turn of a vehicle in the real world, according to one embodiment shown and described herein. Referring to FIG. 4A, the vehicle 400 may make a U-turn with the repetitive movement pattern 402. The vehicle 400 may turn on left turn signals, and then veer to the right to have more space for making a U-turn. The vehicle 400 may then make a U-turn. In embodiments, when the repetitive movement pattern 402 is related to a U-turn movement pattern, the repetitive movement pattern 402 may include turning on the left signal, veering to the right to have more space, and making a U-turn. The driver of the vehicle 400 may think that this repetitive movement pattern 402 is correct or legal. In embodiments, the server 440 may collect, receive, or both, the repetitive movement pattern 402 of the vehicle 400. The server 440 may be communicatively coupled to the vehicle 400 via a network 470.

FIG. 4B depicts a vehicle that is about to initiate the repetitive movement pattern of a U-turn in the real world, according to one embodiment shown and described herein. Referring to FIG. 4B, another object 410 may pass in the next lane of the vehicle 400. In embodiments, another object 410 may be another vehicle. The vehicle 400 may detect another object 410 within a predetermined distance of the vehicle 400. The predetermined distance of the vehicle 400 may depend on the speed of the vehicle 400, the size of the vehicle 400, the speed of another object 410, the size of another object 410, or combinations thereof.

In this example, if the vehicle 400 repeats the repetitive movement pattern of a U-turn, the repeated movement may cause a potential conflict with another object 410. Specifically, when the vehicle 400 turns on left turn signals for a U-turn, another object 410 may expect the vehicle 400 to make a left turn and pass the next lane. Simultaneously, the vehicle 400 may veer to the right to have more space for making a U-turn. These movements may cause a potential conflict 412 between the vehicle 400 and another object 410.

Thus, before the vehicle 400 initiates the repetitive movement pattern 402 of a U-turn, the vehicle 400 may conduct a digital twin simulation to confirm a potential conflict as illustrated in FIG. 4C, and take preventive measures as illustrated in FIG. 4D. In some embodiments, the controller may infer a location where a driver of the vehicle 400 needs the support. For example, if the vehicle 400 repeats the repetitive movement pattern of a U-turn, the controller may analyze the data of the repetitive movement pattern of a U-turn, and recognize that the driver of the vehicle 400 may have some problems with a U-turn. When the vehicle 500 approaches a U-turn spot next time, the driver of the vehicle 400 may be supported by the controller.

FIG. 4C depicts a digital twin simulation of the vehicle and another vehicle, according to one embodiment shown and described herein. Referring to FIG. 4C, the vehicle 400 implements the digital twin simulation of the vehicle 400 and the digital twin simulation of another object 410 to identify this potential conflict 412 between the vehicle 400 and another object 410. In some embodiments, the server 440 may implement the digital twin simulation of the vehicle 400 using the repetitive movement pattern 402 and digital twin simulation of another object 410.

In embodiments, when the vehicle 400 detects another object 410 within a predetermined distance of the vehicle 400 as illustrated in FIG. 4B, the vehicle 400 implements the digital twin simulation of the vehicle 400 using the repetitive movement pattern 402 and the digital twin simulation of another object 410 to identify a potential conflict 412 between the vehicle 400 and another object 410 in response to identifying the vehicle 400 proximate to the predetermined location and detecting another object 410 within the predetermined distance of the vehicle 400. Specifically, in the simulation, the vehicle 400 follows the repetitive movement pattern 402 and another object 410 follows a route 414. Then, a conflict 412 occurs between the repetitive movement pattern 402 and the route 414.

Figure 4E:
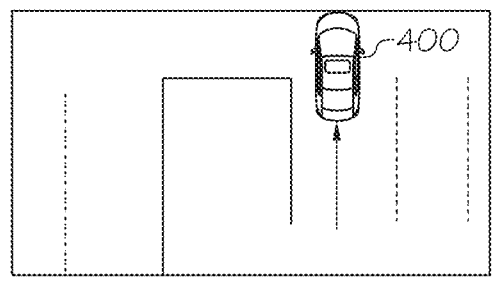
Figure 4F:
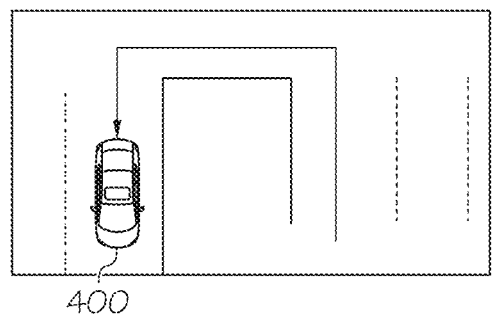

Referring to FIGS. 4D-4F, after the simulation, the vehicle 400 in the real world may inform the driver of the vehicle 400 about predetermined driving behavior that may prevent the potential conflict 412 in response to identifying the potential conflict 412. In embodiment, the vehicle 400 may display the predetermined driving behavior. For example, the screen of vehicle 400 may display the predetermined driving behavior. For example, the screen of vehicle 400 may display the predetermined driving behavior. In some embodiments, the predetermined driving behavior may be displayed on a device other than the device of the vehicle 400, e.g., a smartphone, a smartwatch, a laptop, a tablet computer, a personal computer, and a wearable device, or combinations thereof. In embodiments, the vehicle 400 may display a result of the digital twin simulation of the vehicle 400 and another object 410 showing the potential conflict 412, e.g. the digital twin simulation illustrated in FIG. 4C.

In embodiments, the vehicle 400 or the server 240 may instruct a device of another object 410 to output an alert. In embodiments, the device of another object 410 may include a smartphone, a smartwatch, a laptop, a tablet computer, a personal computer, and a wearable device, or combinations thereof. In embodiments, the vehicle 400 or the server 240 may instruct a device of another object 410 to output an alert with a result of the digital twin simulation of the vehicle 400 and another object 410 showing the potential conflict 412.

Referring to FIGS. 4D-4F, when there is a potential conflict 412 between the vehicle 400 and another object 410, the vehicle 400 may instruct the driver of the vehicle 400 to keep the vehicle 400 straight, turn the wheels of the vehicle 400 without crossing the next lane, and complete a U-turn without swerving. In embodiments, the output device of the vehicle 400 may display a result of the digital twin simulation of the vehicle 400 and another object 410 showing the potential conflict 412, which is shown in FIG. 4C.

Still referring to FIG. 4D, when there is no potential conflict 412 between the vehicle 400 and other object, the vehicle 400 may not instruct the driver of the vehicle 400 to keep the vehicle 400 straight, turn the wheels of the vehicle 400 without crossing the next lane, and complete a U-turn without swerving, and the driver of the vehicle 400 may make a U-turn with the driver's driving behaviors described in FIG. 1A. In some embodiments, the display of an output device of the vehicle 400 to display a result of the digital twin simulation of the vehicle 400 and another object 110 showing the potential conflict 412, which is shown in FIG. 1C.

Referring now to FIGS. 5A, 5B, 5C, and 5D, an exemplary embodiment of correcting driving behavior of a drive of a vehicle where the repetitive movement pattern is related to a parking movement pattern is depicted.

FIG. 5A depicts collecting a repetitive movement pattern of parking of a vehicle in the real world, according to one embodiment shown and described herein. Referring to FIG. 5A, the vehicle 500 may be parked with the repetitive movement pattern 502. The vehicle 500 may be parked at a certain location. The certain location may be a merging lane. In embodiments, when the repetitive movement pattern 502 is related to a parking movement pattern, the repetitive movement pattern 502 may include parking in a merging lane. The driver of the vehicle 500 may think that this repetitive movement pattern 502 is correct or legal. In embodiments, the server 540 may collect, receive, or both, the repetitive movement pattern 502 of the vehicle 500. The server 540 may be communicatively coupled to the vehicle 500 via a network 570.

FIG. 5B depicts a vehicle that is about to initiate the repetitive movement pattern of the parking in the real world, according to one embodiment shown and described herein. Referring to FIG. 5B, a first another object 510 and a second another object 520 may turn left in to the lane of the vehicle 500 and the next lane of the vehicle 500. In embodiments, each of the first another object 510 and the second another object 520 may be another vehicle. The vehicle 500 may detect at least one of the first another object 510 and the second another object 520 within a predetermined distance of the vehicle 500. The predetermined distance of the vehicle 500 may depend on the speed of the vehicle 500, the size of the vehicle 500, the speed of first another object 510, the size of first another object 510, the speed of second another object 520, the size of second another object 520, or combinations thereof.

In this example, if the vehicle 500 repeats the repetitive movement pattern of parking, the repeated movement may cause a potential conflict with the first another object 510. Specifically, when the vehicle 500 parks at a merging lane, the first another object 510 and the second another object 520 may simultaneously turn left. These movements may cause a potential conflict 512 between the vehicle 500 and the first another object 510.

Thus, before the vehicle 500 initiates the repetitive movement pattern 502 of parking, the vehicle 500 may conduct a digital twin simulation to confirm a potential conflict as illustrated in FIG. 5C, and take preventive measures as illustrated in FIG. 5D.

FIG. 5C depicts a digital twin simulation of the vehicle, the first another vehicle, and the second another vehicle, according to one embodiment shown and described herein. Referring to FIG. 5C, the vehicle 500 implements the digital twin simulation of the vehicle 500 and digital twin simulation of the first another object 510 and the second another object 520 to identify this potential conflict 512 between the vehicle 500 and the first another object 510. In some embodiments, the server 540 may implement the digital twin simulation of the vehicle 500 using the repetitive movement pattern 502 and digital twin simulation of the first another object 510.

In embodiments, when the vehicle 500 detects the first another object 510 and the second another object 520 within a predetermined distance of the vehicle 500 as illustrated in FIG. the vehicle 500 implements the digital twin simulation of the vehicle 500 using the repetitive movement pattern 502 and the digital twin simulation of first another object 510 and second another object 520 to identify a potential conflict 512 between the vehicle 500 and the first another object 510 in response to identifying the vehicle 500 proximate to the predetermined location and detecting another object 510 within the predetermined distance of the vehicle 500. Specifically, in the simulation, the vehicle 500 follows the repetitive movement pattern 502, and the first another object 510 and the second another object 520 follow route 514. Then, conflict 512 occurs between the repetitive movement pattern 502 and the route 514.

Referring to FIG. 5D, after the simulation, the vehicle 500 in the real world may inform the driver of the vehicle 500 about predetermined driving behavior that may prevent the potential conflict 512 in response to identifying the potential conflict 512. In embodiments, the vehicle 500 may display the predetermined driving behavior. For example, the screen of vehicle 500 may display the predetermined driving behavior. For example, the screen of vehicle 500 may display the predetermined driving behavior. In some embodiments, the predetermined driving behavior may be displayed on a device other than the device of the vehicle 500, e.g., a smartphone, a smartwatch, a laptop, a tablet computer, a personal computer, and a wearable device, or combinations thereof. In embodiments, the vehicle 500 may display a result of the digital twin simulation of the vehicle 500, the first another object 510, and the second another object 520 showing the potential conflict 512, e.g. the digital twin simulation illustrated in FIG. 5C.

In embodiments, the vehicle 500 or the server 540 may instruct a device of the first another object 510 to output an alert. In embodiments, the device of the first another object 510 may include a smartphone, a smartwatch, a laptop, a tablet computer, a personal computer, and a wearable device, or combinations thereof. In embodiments, the vehicle 500 or the server 540 may instruct a device of the first another object 510 to output an alert with a result of the digital twin simulation of the vehicle 500, the first another object 510, and the second another object 520 showing the potential conflict 512.

Referring to FIG. 5D, when there is a potential conflict 512 between the vehicle 500 and the first another object 510, the vehicle 500 may instruct the driver of the vehicle 500 not to park at a merging lane. In embodiments, the output device of the vehicle 500 may display a result of the digital twin simulation of the vehicle 500, the first another object 510, and the second another object 520 showing the potential conflict 512, which is shown in FIG. 5C.

Still referring to FIG. 5D, when there is no potential conflict 512 between the vehicle 500 and other object, the vehicle 500 may not instruct the driver of the vehicle 500 not to park in a merging lane, and the driver of the vehicle 500 may park with the driver's driving behaviors described in FIG. 5A. In embodiments, the display of an output device of the vehicle 500 to display a result of the digital twin simulation of the vehicle 500, the first another object 510, and the second another object 520 showing the potential conflict 512, which is shown in FIG. 5C.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprising:
a controller programmed to:
identify a repetitive movement pattern of a driver of a vehicle at a predetermined location based on accumulated driving data of the vehicle;
implement digital twin simulation of the vehicle using the repetitive movement pattern and the digital twin simulation of another object to identify a potential conflict between the vehicle and the another object; and
inform the driver of the vehicle about predetermined driving behavior in response to identifying the potential conflict.

2. The system of claim 1, wherein the controller is further programmed to:
implement the digital twin simulation of the vehicle using the repetitive movement pattern and the digital twin simulation of the another object to identify the potential conflict between the vehicle and the another object in response to identifying the vehicle proximate to the predetermined location.

3. The system of claim 1, wherein the controller is further programmed to:
receive an indication of a turn signal of the vehicle being turned on; and
implement the digital twin simulation of the vehicle using the repetitive movement pattern and the digital twin simulation of the another object to identify the potential conflict between the vehicle and the another object in response to receiving the indication of the turn signal of the vehicle being turned on.

4. The system of claim 1, wherein the repetitive movement pattern is related to a parking movement pattern, and the predetermined location includes parking spot.

5. The system of claim 1, wherein the repetitive movement pattern is related to a turning movement pattern, and the predetermined location includes a turning spot.

6. The system of claim 5, wherein the turning movement pattern includes a U-turn movement pattern, and the predetermined location includes a U-turn spot.

7. The system of claim 1, wherein the controller is further programmed to:
instruct a display of an output device of the vehicle or a display of a device of the driver to display the predetermined driving behavior.

8. The system of claim 1, wherein the controller is further programmed to:
instruct a display of an output device of the vehicle to display a result of the digital twin simulation of the vehicle and the another object showing the potential conflict.

9. The system of claim 1, wherein the controller is further programmed to:
instruct a device of the another object to output an alert.

10. The system of claim 1, wherein the controller is further programmed to:
detect the another object within a predetermined distance of the vehicle; and
implement the digital twin simulation of the vehicle using the repetitive movement pattern and the digital twin simulation of another object to identify the potential conflict between the vehicle and the another object in response to identifying the vehicle proximate to the predetermined location and detecting the another object within the predetermined distance of the vehicle.

11. A method for correcting driving behavior of a driver of a vehicle, the method comprising:
identifying a repetitive movement pattern of the driver of the vehicle at a predetermined location based on accumulated driving data of the vehicle;
implementing digital twin simulation of the vehicle using the repetitive movement pattern and the digital twin simulation of another object to identify a potential conflict between the vehicle and the another object; and
informing the driver of the vehicle about predetermined driving behavior in response to identifying the potential conflict.

12. The method of claim 11, further comprising implementing the digital twin simulation of the vehicle using the repetitive movement pattern and the digital twin simulation of the another object to identify the potential conflict between the vehicle and the another object in response to identifying the vehicle proximate to the predetermined location.

13. The method of claim 11, further comprising:
receiving an indication of a turn signal of the vehicle being turned on; and
implementing the digital twin simulation of the vehicle using the repetitive movement pattern and the digital twin simulation of the another object to identify the potential conflict between the vehicle and the another object in response to receiving the indication of the turn signal of the vehicle being turned on.

14. The method of claim 11, wherein the repetitive movement pattern is related to a parking movement pattern, and the predetermined location includes parking spot.

15. The method of claim 11, wherein the repetitive movement pattern is related to a turning movement pattern, and the predetermined location includes a turning spot.

16. The method of claim 15, wherein the turning movement pattern includes a U-turn movement pattern, and the predetermined location includes a U-turn spot.

17. The method of claim 11, further comprising instructing a display of an output device of the vehicle or a display of a device of the driver to display the predetermined driving behavior.

18. The method of claim 11, further comprising instructing a display of an output device of the vehicle to display a result of the digital twin simulation of the vehicle and the another object showing the potential conflict.

19. The method of claim 11, further comprising instructing a device of the another object to output an alert.

20. A vehicle comprising:
an actuator configured to move the vehicle;

a controller programmed to:
  identify a repetitive movement pattern of a driver of the vehicle at a predetermined location based on accumulated driving data of the vehicle;
  implement digital twin simulation of the vehicle using the repetitive movement pattern and the digital twin simulation of another object to identify a potential conflict between the vehicle and the another object in response to identifying the vehicle proximate to the predetermined location; and
  transmit predetermined driving behavior to an output device in response to identifying the potential conflict; and
the output device configured to output the predetermined driving behavior.

* * * * *

UNITED STATES PATENT AND TRADEMARK OFFICE
CERTIFICATE OF CORRECTION

PATENT NO. : 12,060,067 B2
APPLICATION NO. : 17/859701
DATED : August 13, 2024
INVENTOR(S) : Seyhan Ucar et al.

It is certified that error appears in the above-identified patent and that said Letters Patent is hereby corrected as shown below:

In the Drawings

In drawing sheet(s) 5 of 9, figure 3, and on the title page, the illustrative print figure, block 310, after "A VEHICLE", delete "AT AT" And insert --AT--, therefor.

Signed and Sealed this
Nineteenth Day of November, 2024

Katherine Kelly Vidal
*Director of the United States Patent and Trademark Office*